United States Patent [19]

Moraly

[11] Patent Number: 4,640,371
[45] Date of Patent: Feb. 3, 1987

[54] PROCESS AND TOOL FOR BORING CAVITY HOLES, MORE ESPECIALLY IN CONCRETE PLASTER OR SIMILAR WALLS

[75] Inventor: Paul Moraly, Rosny Sous Bois, France

[73] Assignee: Sarkis S.A., Chexbres, Switzerland

[21] Appl. No.: 744,607

[22] Filed: Jun. 14, 1985

[30] Foreign Application Priority Data

Aug. 16, 1984 [FR] France .................................. 84 12859
Dec. 31, 1984 [FR] France .................................. 84 20102

[51] Int. Cl.$^4$ ............................................ E21B 10/32
[52] U.S. Cl. ........................................ 175/61; 175/73; 175/273
[58] Field of Search ...................... 175/57, 61, 73, 263, 175/265, 273

[56] References Cited

U.S. PATENT DOCUMENTS

| 2,193,721 | 3/1940 | Gunderson | 175/263 |
| 2,593,035 | 4/1952 | Karbowski | 175/263 |
| 3,960,222 | 6/1976 | Leibee et al. | 175/263 |

FOREIGN PATENT DOCUMENTS

| 65302 | 3/1892 | Fed. Rep. of Germany | 175/263 |
| 987666 | 10/1951 | France | 175/263 |
| 54664 | 3/1966 | Poland | 175/263 |
| 124897 | 8/1958 | U.S.S.R. | 175/263 |

Primary Examiner—Stephen J. Novosad
Assistant Examiner—William P. Neuder
Attorney, Agent, or Firm—William A. Drucker

[57] ABSTRACT

A tool for boring cavity holes in concrete walls and the like comprises a cutting blade pivotally mounted about a transverse pin at the end of an elongate body and having a camming profiled portion. A ball is placed at the bottom of the hole which has first been bored with a conventional drill and the tool cutting blade is brought into contact with the ball while causing rapid rotation of the tool body and exerting an axial pressure. The ball cooperates with the blade camming profiled portion so as progressively to orient the blade in a transverse direction.

13 Claims, 14 Drawing Figures

PROCESS AND TOOL FOR BORING CAVITY HOLES, MORE ESPECIALLY IN CONCRETE PLASTER OR SIMILAR WALLS

BACKGROUND OF THE INVENTION

The problem of boring cavity or shoulder holes in concrete, plaster or similar walls, for fixing certain bolts or pegs for example, has only been solved up to present by means of relatively complex tools, which do not allow a wide variety in the shape and dimensions of the cavities to be obtained and the handling of which is delicate.

The invention provides a process for boring cavity holes using a tool of very simple construction and having great flexibility and great ease of use.

SUMMARY OF THE INVENTION

The tool of the invention comprises at least one blade movable angularly about a transverse pin disposed at the end of an elongate body and means for giving a variable slant to said blade when an axial thrust is maintained on said body for moving it beyond the point at which the tool comes into abutment against the bottom of the hole and wherein said blade comprises a shaped camming surface portion which cooperates with a shaped surface portion of a piece in abutment against the bottom of the hole, the two said cooperating surface portions being shaped so that the cutting portion of the blade passes, for a short axial travel of the elongate body, from a substantially axial orientation to a substantially transverse orientation.

The result of this arrangement is that the blade effects hollowing out in the opposite direction to the axial thrust, which allows a cavity to be obtained of relatively large volume comprising a shoulder on the side opposite the bottom of the hole, so particularly efficient for retaining an expansion or sealed peg or bolt.

In a first embodiment, said shaped piece is simply formed by a ball placed at the bottom of the hole and the process of the invention consists then in boring a hole with a conventional drill, introducing the ball therein and bringing the blade of the tool of the invention into contact with the ball, while causing rapid rotation of the body of the tool using conventional means and exerting an axial pressure. The ball then fulfils three functions, namely:

it prevents the tool from hollowing out further along the axis of the hole, it acts on the cam part of the blade and causes it to swing out, by rotating in all directions on itself, it follows the stresses of the work of the blade which rotates about the axis of the elongate body and swings about said transverse axis.

In a second embodiment, said shaped piece is an element incorporated in the tool, comprising a cam portion retained in a housing formed at the end of the elongate body of the tool and into which the cam profile of the blade penetrates so as to bear on said cam portion, and an extension which projects beyond the edge of said elongate body, along the axis thereof, said extension having at its free end a spherical part intended to rest at the bottom of the hole.

The process of the invention then consists in boring the hole with a conventional drill, then introducing the tool therein until the spherical part is brought to the bottom of the hole and rotating the body of the tool while exerting an axial thrust.

Once the shoulder is formed, the tool may be withdrawn by a simple axial pull. During this removal, the blade which at the beginning projects radially butts against the front edge of the shoulder and swings aside.

According to another feature of the invention, the end face of the elongate body which has a passage slit for the blade is shaped so that it has a spherical cavity or centering cup for the ball.

This cup facilitates recentering of the ball which cooperates with the blade, which is more especially advantageous when, in a first operation forming the cavity, several balls are introduced into a hole previously bored with a conventional drill, the blade of the tool then being brought into contact with the last ball introduced so as to obtain a first cavity portion; then a second operation is carried out after removing the last ball so as to obtain a second cavity portion connected to the first one and so on until the last operation, carried out by leaving only the first ball at the bottom of the hole.

According to a further feature of the invention, the axis of said cup and of the elongate body is offset with respect to the axis of rotation of the blade, which increases the lever effect causing the blade to swing, in particular close to the transverse position thereof.

The invention further proposes offsetting said slit with respect to the center of the end face of the elongate body, so as to reinforce the end portion of the elongate body on which the reaction and the force of the blade are exerted during rotation of the tool about its axis.

BRIEF DESCRIPTION OF THE DRAWINGS

Other features and advantages of the invention will be clear from the following description.

In the accompanying drawings

DESCRIPTION OF THE PREFERRED EMBODIMENTS

Figure 3:
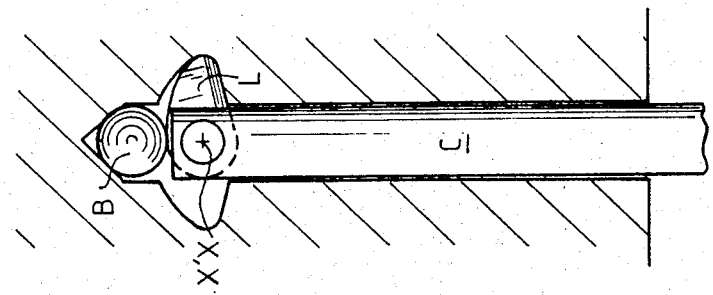
FIGS. 1 to 3 illustrate the process of the invention, according to a first embodiment of the tool.
Figure 2:
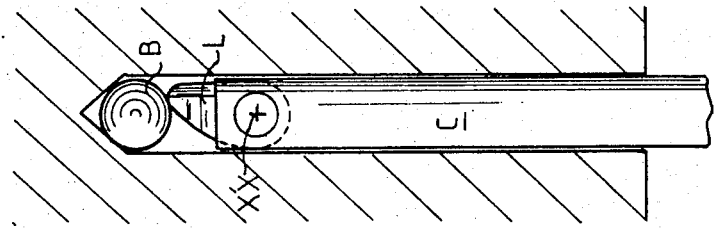
Figure 1:
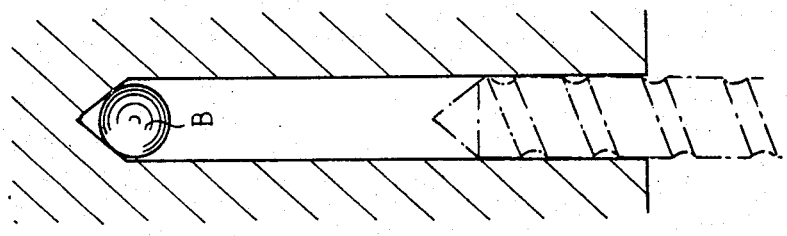

FIG. 1 illustrates the first phase of the process which consists in boring a hole with a conventional drill and then introducing a ball B at the bottom of the hole. The tool of the invention comprises, in this first embodiment, an elongate body C having at its active end a blade L movable angularly about an axis X'X and comprising, besides its cutting edge, a cam profile which bears on the ball. The tool is rotated about the longitudinal axis of body C and a thrust is exerted parallel to said axis. The ball stops the blade and prevents it from boring more deeply; on the other hand, it causes it to slant all the more so the greater the thrust. FIG. 3 shows that the slanted blade will thus hollow out a cavity whose shape, in revolution about said longitudinal axis, depends on the thrust exerted and on the profile of the cutting edge of the blade. It is possible to effect several successive operations in the same hole for increasing the depth of the cavity.

The ball may be made from steel and recovered at the end of boring by means of a flexible magnetized rod.

Of course, different solutions may be envisaged for mounting the blade to the end of the elongate body.

One of these solutions consists for example in providing a slot at the end of the elongate body so as to form a fork in which the blade is hinged. In this case, the hinge axis which passes through the two legs of the fork may be rigidly fixed thereto, for example by welding, crimping or by any other known means so as to prevent the two legs from moving apart during use. Such an arrangement contributes then to making the tool more reliable.

In addition, so as to facilitate its introduction in the hole, the tool may comprise means for locking the blade in one direction of rotation, the blade then being preferably in an axially projecting position with respect to the elongate body. In the above described example, these locking means may simply consist of abutment surfaces suitably provided on said blade and on said body.

Figure 6:
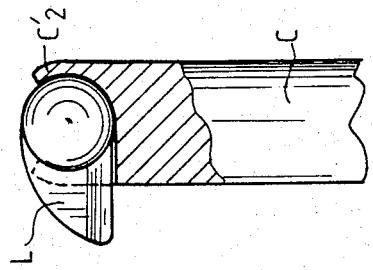
FIGS. 5 and 6 show the end of the tool fitted with the blade.
Figure 4:
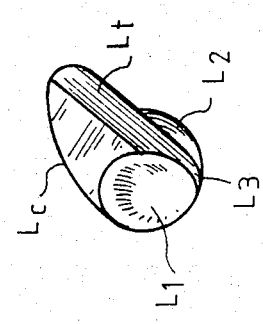
FIG. 4 shows another embodiment of the blade of the tool, having spherical portions forming a pivoting axis.

FIG. 4 illustrates a particularly advantageous embodiment of the blade, which is here provided on its two faces, at its pivoting end, with two sphere portions $L_1L_2$ which enclose said end $L_3$ so as to form therewith a spherical body adapted for engagement in a corresponding cavity at the end of the body of the tool and is held there by Crimping at $C'_2$, shown in FIG. 6.

Figure 5:
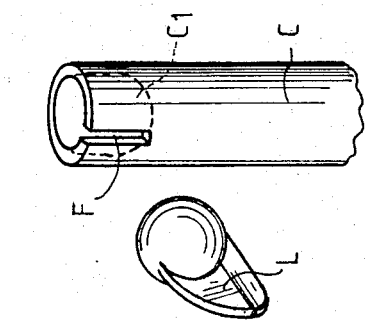

In FIG. 5 it can be seen that this cavity $C_1$ has, before its end $C_2$ is crimped, a cylindrical part open at said end extended by a semi spherical part. FIG. 6 shows that, after introduction of the spherical body of the blade into the cavity, the edge thereof is crimped at its end so as to retain said body. A slot F open along a generatrix of the cylindrical body C as far as the end thereof, allows the blade to pass therein.

In FIG. 4 can be seen the cutting edge $L_t$ of the blade and the shaped cam-forming part $L_c$.

Figure 7:
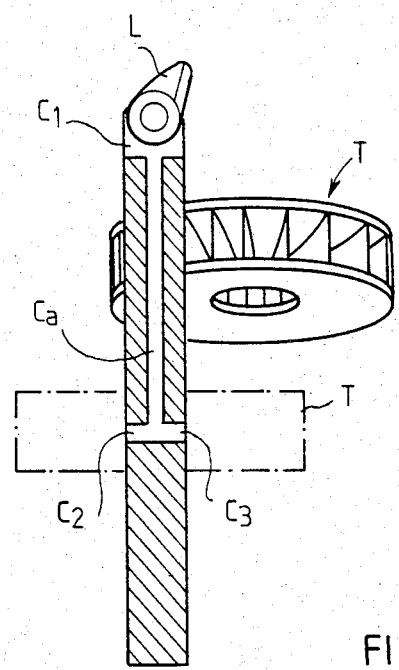
FIG. 7 is a longitudinal sectional view of the tool, showing the channels for removing the drilling dust.

In FIG. 7, which shows the body of the tool in longitudinal section, it can be seen that an axial channel $C_a$ communicates the open cavity $C_1$, in which the drilling dust penetrates, with axial discharge channels $C_2$, $C_3$. These channels may be provided with flexible tubes (not shown) extending them axially, in which the centrifugal force creates a depression which sucks up the dust from the bottom of the hole. As a variant, and as shown in FIG. 7, a wind turbine T may be disposed about body C, at the levels of channels $C_2C_3$, so as to reinforce the suction effect.

Figure 8:
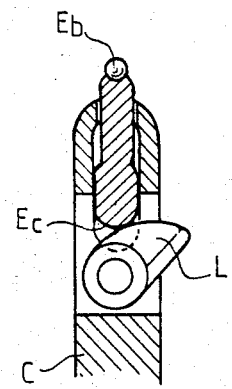
FIG. 8 illustrates a second embodiment.

FIG. 8 illustrates the second above mentioned embodiment, in which the ball B is replaced by an element interlocked with the body C of the tool. This element comprises a cam-forming portion $E_c$, retained in a housing formed at the end of the body C, and an extension which projects from the housing beyond the end of body C and forms a ball $E_b$ at its end. It is obvious that this ball will bear on the bottom of the hole, whereas the cam-forming portion $E_c$ bears on the cam profile of the blade L, so as to modify the slant thereof depending on the axial thrust exerted on the tool. With this embodiment, there is no need for a ball lost at the bottom of the hole and which must be recovered at the end of each operation.

The invention is not limited to the use of a single blade at the end of the elongate body.

Figure 10:
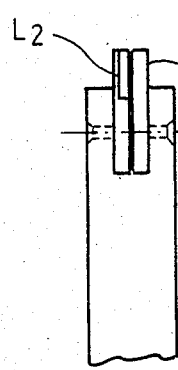
FIGS. 9 and 10 are axial sections of another embodiment of the tool using two blades.
Figure 9:
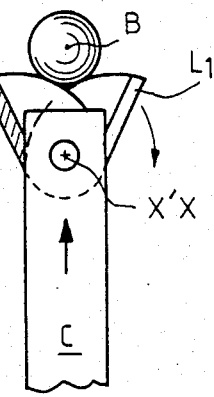

It may for example comprise two blades $L_1$, $L_2$ hinged at a fork-forming end of the elongate body C, as shown in FIGS. 9 and 10, these two blades $L_1$, $L_2$ corresponding with the same shaped piece (ball B).

The advantage of this solution resides in the fact that the two blades $L_1$, $L_2$ work simultaneously and in opposition so that the resultant of the transverse forces which they exert on the elongate body C tends to cancel out. Thus a reduction of the friction forces exerted on said body C is obtained.

It goes without saying that other different embodiments of the tool described and shown, in particular in so far as the blade and its shape are concerned, may be thought up by a man skilled in the art, without departing from the scope of the accompanying claims.

Thus, the elongate body may be at least partially surrounded by a freely rotating ring or sleeve, for eliminating the friction and consequently the wear of the body in contact with the hole.

Figure 11:
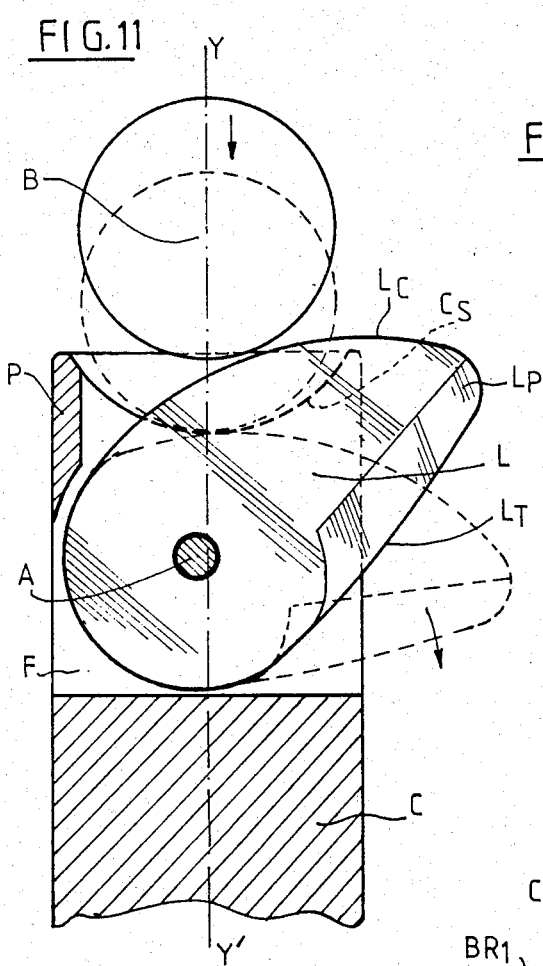
FIG. 11 is a view of the active endmost part of the tool according to a preferred variant, in section through the median plane of the blade and of the slot.
Figure 14:
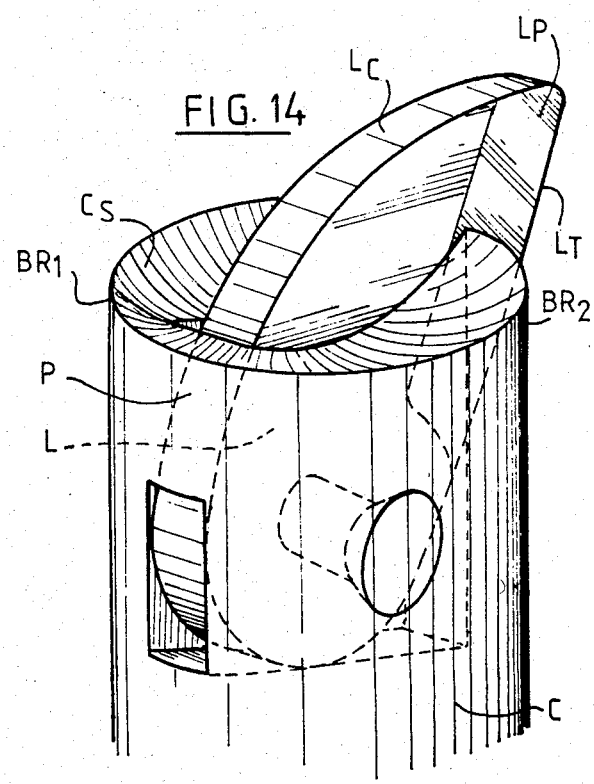
FIG. 14 is a schematical perspective view of the active end part of the tool of the type shown in FIGS. 11 and 12.

In FIGS. 11 and 14, the active end part of body C of the tool has been shown, with blade L movable angularly about an axis A. The cutting edge $L_T$ of the blade is extended beyond point $L_p$ by a cam profile $L_C$ which cooperates with the ball B placed at the bottom of the hole. When the above described process is applied, the blade slants progressively while rotating about its axis in the direction shown by an arrow (FIG. 12) when an axial thrust is exerted on the body C and its cutting edge $L_T$ thus passes, for a short axial travel distance of the elongate body, from an initial substantially axial orientation to a final substantially transverse orientation, shown in the drawings.

Figure 12:
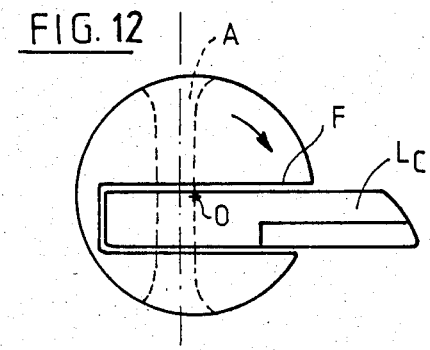
FIG. 12 is an end view of the active end part of the tool.

A cavity, of revolution about the axis of symmetry YY' of the tool, is thus hollowed out by an action of the cutting edge $L_T$ directed in the opposite direction to the axial thrust. It will be noted that such hollowing out is obtained by combining rotation of the tool about axis YY' with an axial thrust, without exercising any percussion, contrary to what happens in the initial action of a conventional drill. As can be seen in FIG. 12, the blade extends from the endmost face through a slot F. In the preferred embodiment described, this slot is offset with respect to the center O of said endmost face. The result is that the end part of body C comprises a reinforced side on which the reaction of the blade is exerted during rotation of the tool around axis YY'. Thus any risk of breakage of the blade through deformation of the surface of the tool on which it bears is eliminated.

FIG. 11 shows that said end face of body C forms a spherical cup $C_S$ of a diameter very slightly greater than that of the ball. Such a shape for the end portion of body C not only ensures centering of the ball but also provides a rigid support for the blade on the wall portions of the slot which thus project beyond the transverse plane tangent to the bottom of the cup, when the blade is relatively little slanted with respect to the axis YY'.

FIG. 11 further shows that the axis A is offset with respect to the axis of symmetry YY' of body C and of the cup. The result is that, even in the vicinity of the transverse position of the blade, the reaction force exerted by the ball at its point of contact with the blade and the force of reaction exerted by pin A on the blade continue to form a force for swinging the blade.

Figure 13:
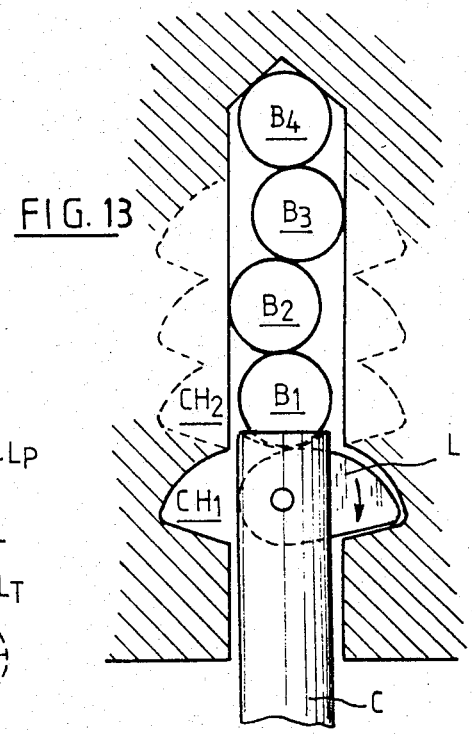
FIG. 13 illustrates a boring processing using several balls.

In FIG. 13 has been shown a cavity formed from multiple contiguous portions obtained as follows: a first portion $CH_1$ is obtained by using the cooperation of the tool with four balls $B_1$ to $B_4$ for example; the second portion $CH_2$ is obtained in a second operation in which the tool only cooperates with balls $B_2$ to $B_4$, ball $B_1$ having been removed and so on. It is clear that in this process, the ball which cooperates directly with the cam profile of the blade is centered by the spherical cup of the tool, the other balls being more or less off centered without inconvenience.

In a particularly advantageous embodiment, the two legs $BR_1$ and $BR_2$ of body C, separated by slot F, are joined together on the side opposite that where swinging of blade L takes place, by a small metal piece P forming a bridge whose purpose is more especially:

- to lock the blade for rotation in one direction, so as to prevent it from swinging and rising on the wrong side, and
- to reinforce the two legs $BR_1$ and $BR_2$ so as to increase, conjointly with the action of pin A of blade L, their resistance to being forced apart and thus to prevent the slot from opening.

This metal piece P may be integrally formed with the body and be obtained during machining of slot F. It may also be formed by an added piece.

Preferably, it is shaped so as to remain in the general line of body C and may therefore advantageously comprise, as shown, an external lateral face prolonging and continuing the external lateral shapes of legs $BR_1$ $BR_2$, and a spherical end face ensuring continuity of form with the spherical cup $C_S$.

What is claimed is:

1. An expansion bit, comprising at least one blade movable angularly about a transverse axis disposed at one end of an elongate rotatable shank and a further member which has a first smooth shaped camming surface portion having a symmetry of revolution about the shank axis, said blade having a second shaped smooth camming surface portion adapted for engagement with said first shaped surface portion, said blade further having a cutting surface portion opositely disposed with respect to the second smooth surface portion, the first and second mutually engaging surface portions being so shaped and arranged that the cutting surface portion of the blade, passes, for a short axial travel distance of the shank within a hole in the direction of the bottom of said hole and beyond the point where the further member abuts against the said bottom from a substantially axial orientation to a substantially transverse orientation in which the cutting surface portion is nearer to the opposite end of the shank than the second smooth surface portion.

2. An expansion bit as claimed in claim 1, wherein said blade is provided on its faces, at its pivoting end, with two sphere portions which encompass said end so as to form therewith a spherical body adapted for engagement in a cavity formed at the end of the said one shank; whereas the cutting surface portion of the blade passes through a slot open along generatrix of the shank of the tool, said slot extending to the said one end.

3. An Expansion bit as claimed in claim 1, comprising two blades movably angularly about a transverse axis at the said one end of the shank, said two blades cooperating with a single further member.

4. A process for boring a cavity hole using the expansion bit as claimed in claim 1, consisting in boring a hole with a conventional drill, introducing therein a ball which forms said further member and bringing the blade into contact with said ball, while causing the shank to rotate rapidly and exerting an axial pressure thereon.

5. A process for boring a cavity hole as claimed in claim 4, comprising the steps of forming a first cavity portion by introducing a plurality of balls into the bottom of a hole previously bored with a conventional drill, and bringing the expansion bit into contact with the lastly introduced ball; forming a second cavity portion connected to the first cavity portion by using the expansion bit after removal of the said lastly introduced ball and successively forming further mutually connected cavity portions with successive removals of the successive balls, until a last cavity portion is formed while leaving at the bottom of the hole only the firstly introduced ball.

6. An expansion bit as claimed in claim 1, wherein the said one end of
the shank has a passage slot for the blade and is shaped to form a spherical cavity or centering cup for receiving a ball which forms said further member.

7. An expansion bit as claimed in claim 6, wherein said cup and said shank have a common axis of symmetry which is offset with respect to the axis of rotation of the blade, which increases the lever effect which causes the blade to swing, in particular close to the transverse position thereof.

8. An expansion bit as claimed in claim 6, wherein said slot is offset, with respect to the center of the said one end of the
shank, so as to reinforce the end portion of the elongate body on which the reaction of the blade is exerted during rotation of the tool about its axis.

9. An expansion bit as claimed in claim 6, wherein the said one end of the shank comprises two legs separated by the slot on one side and joined on the opposite side by a bridging portion arranged for locking the blade against pivoting in the wrong direction.

10. An expansion bit as claimed in claim 1, wherein the blade is elongate and said transverse axis is located at one end thereof, while each of said cutting surface portion and the said second camming surface portion substantially extends from said one end of the blade to the opposite end thereof on respective opposite sides of the elongate blade.

11. An expansion bit, comprising at least one blade movable angularly about a transverse axis disposed at one end of an elongate rotatable shank and a further member which is adapted for free rotation and has a first smooth shaped camming surface portion having a symmetry of revolution about the shank axis, said blade having a second shaped smooth camming surface portion adapted for engagement with said first shaped surface portion, said blade further having a cutting surface portion oppositely disposed with respect to the second smooth surface portion, the first and second mutually engaging surface portions being so shaped and arranged that the cutting surface portion of the blade, passes, for a short axial travel distance of the shank within a hole in the direction of the bottom of said hole and beyond the point where the further member abuts against the said bottom from a substantially axial orientation to a substantially transverse orientation in which the cutting surface portion is nearer to the opposite end of the shank than the second smooth surface portion.

12. An expansion bit as claimed in claim 11, wherein said further member has a cam-forming portion retained in a housing formed at the end of the shank and into which the camming surface portion of the blade penetrates and comes to bear on said cam-forming portion and an extension which projects beyond the said one end of the shank, along the axis thereof, said extension having at its free end a spherical part adapted for bearing against the bottom of the hole.

13. A process for boring a cavity hole using the expansion bit as claimed in claim 12, consisting in boring a hole with a conventional drill, then introducing said expansion bit therein until the spherical part is brought into engagement with the bottom of the hole and rotating the body of the tool while exerting an axial thrust.

* * * * *